United States Patent
Ito et al.

(10) Patent No.: US 6,866,389 B2
(45) Date of Patent: Mar. 15, 2005

(54) OPTICAL DEVICE AND PROJECTOR

(75) Inventors: Shinsuke Ito, Shojiri (JP); Takeshi Takizawa, Shojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/682,490

(22) Filed: Oct. 10, 2003

(65) Prior Publication Data

US 2004/0165152 A1 Aug. 26, 2004

(30) Foreign Application Priority Data

Oct. 18, 2002 (JP) .................................... 2002-304882

(51) Int. Cl.⁷ .............................................. G03B 21/14
(52) U.S. Cl. ........................... 353/119; 353/52; 349/58
(58) Field of Search .............................. 353/31, 34, 37, 353/119, 122; 349/5, 7, 8, 9, 58

(56) References Cited

U.S. PATENT DOCUMENTS

| | | | |
|---|---|---|---|
| 5,868,485 A | 2/1999 | Fujimori et al. | |
| 6,053,616 A | 4/2000 | Fujimori et al. | |
| 6,056,407 A | 5/2000 | Iinuma et al. | |
| 6,135,600 A | * 10/2000 | Fujimori | 353/119 |
| 6,322,217 B1 | * 11/2001 | Fujimori et al. | 353/31 |
| 6,411,438 B1 | 6/2002 | Itoh et al. | |
| 6,587,167 B1 | 7/2003 | Fujimori et al. | |
| 6,657,680 B2 | * 12/2003 | Takizawa | 349/5 |

FOREIGN PATENT DOCUMENTS

| | | |
|---|---|---|
| JP | A 8-304739 | 11/1996 |
| JP | A 2000-221588 | 8/2000 |
| JP | A 2001-195006 | 7/2001 |
| JP | A 2003-121931 | 4/2003 |

* cited by examiner

*Primary Examiner*—William C. Dowling
(74) *Attorney, Agent, or Firm*—Oliff & Berridge, PLC

(57) ABSTRACT

An optical device (44) has a holding frame (446) that holds a liquid crystal panel (441) as an optical modulator and has an opening (446C) at a part corresponding to an image formation area of the liquid crystal panel (441), and a panel fixing plate (447) disposed between the holding frame (446) and a cross dichroic prism (444). The panel fixing plate (447) is made of a component having a thermal expansion coefficient lying midway between the thermal expansion coefficients of the holding frame (446) and the cross dichroic prism (444). The liquid crystal panel (441) is fixed on a side of the cross dichroic prism (444) through the holding frame (446) and the panel fixing plate (447). Accordingly, a thermal stress generated on the boundaries between the panel fixing plate (447), and the holding frame (446) and the cross dichroic prism (444) are reduced, thereby preventing the position shift of the liquid crystal panel (441).

18 Claims, 11 Drawing Sheets

OPTICAL DEVICE AND PROJECTOR

FIELD OF THE INVENTION

The present invention relates to an optical device and a projector.

BACKGROUND ART

Conventionally, projectors having a plurality of optical modulators respectively for modulating a plurality of color lights in accordance with image information, a color-combining optical element for combining the respective modulated color lights to form an optical image, and a projection lens for enlarging and projecting the formed optical image have been used.

In such projectors, a color-separating optical system such as a dichroic mirror separates a light beam irradiated by a light source into three color lights. Three optical modulators such as liquid crystal panels respectively modulate the color lights in accordance with the image information. The color-combining optical element such as a cross dichroic prism combines the modulated color lights to form an optical image. Finally, the projection lens enlarges and projects the optical image.

The respective optical modulators of such projectors have to be disposed at the back focus position of the projection lens. Further, in order to obtain a clearer image, pixel shift between the respective optical modulators and deviation in the distance from the projection lens have to be eliminated.

Accordingly, in manufacturing the projectors, a focus-adjusting process for accurately disposing the respective optical modulators at the back focus position of the projection lens and an alignment-adjusting process for aligning the pixels of the respective optical modulators are conducted with high accuracy. For instance, an optical device having optical modulators directly fixed on light-incident sides of a color-combining optical element after adjusting the positions of the optical modulators has been proposed (see Japanese Patent Laid-Open Publication No. 2000-221588).

In order to construct the optical device, a liquid crystal panel is accommodated in a holding frame having holes on four corners thereof, and pins with an adhesive being coated on the circumference thereof are inserted to the holes. Then, the ends of the pins and the light-incident side of the cross dichroic prism and the side of the pin and the hole of the holding frame are mutually adhered and fixed (so-called pin-spacer POP [Panel On Prism]). The material of the pins is an acrylic resin molded article.

In the above pin-spacer POP structure, an acrylic resin molded article is used for the pin component. Accordingly, the thermal expansion coefficient of the pin becomes higher than the holding frame or the color-combining optical element, so that a great thermal stress is generated at the boundaries of the respective components. Consequently, the thermal stress unstabilizes the connection between the pin and the holding frame or the color-combining optical element, so that a pixel shift on account of mutual position shift of the respective optical modulators fixed by the pin and position shift of the optical modulators relative to the back focus position of the projection lens are likely to be caused.

An object of the present invention is to overcome the above deficiencies and to provide an optical device and a projector capable of preventing the position shift of the optical modulators and forming a clear optical image.

SUMMARY OF THE INVENTION

An optical device according to an aspect of the present invention has: a plurality of optical modulators that respectively modulates a plurality of color lights in accordance with image information; a color-combining optical element that combines the respective color lights modulated by the optical modulators, the color-combining optical element being integrated with the optical modulators; a holding frame that holds the optical modulator and has an opening at a portion corresponding to an image formation area of the optical modulator; and a holder disposed between the holding frame and the color-combining optical element, in which the holder includes a component having a thermal expansion coefficient lying midway between the thermal expansion coefficients of the holding frame and the color-combining optical element, and the optical modulator is fixed on a side of the color-combining optical element through the holding frame and the holder.

The thermal expansion coefficient of the holder lying midway between the thermal expansion coefficients of the holding frame and the color-combining optical element refers to that the value of the thermal expansion coefficient of the holder falls within a range between the thermal expansion coefficient of the holding frame and the thermal expansion coefficient of the color-combining optical element. In other words, when the components are placed in ascending or descending order of the color-combining optical element, the holder and the holding frame.

According to the above aspect of the present invention, since the holder has the thermal expansion coefficient lying midway between the thermal expansion coefficients of the holding frame and the color-combining optical element, the thermal stress generated at the respective boundaries between the holder and the holding frame and between the holder and the color-combining optical element can be reduced. Accordingly, when the temperature of the optical device is raised, the position shift of the optical modulator can be prevented without unstabilizing the connection between the holder and the holding frame and between the holder and the color-combining optical element. Further, the deterioration of the optical device can be prevented and clear image formation can be maintained.

Incidentally, when the holder or the holding frame is constructed of a plurality of components, it is only necessary that the portion directly used for fixing the component with the optical modulator and the side of the color-combining optical element satisfies the above requirement.

In the above aspect of the present invention, the holder may preferably be a molded article obtained by molding a resin composition composed of a fiber filler and a resin.

The fiber filler may be a glass fiber, a carbon fiber, a carbon nanotube and the like.

The resin may be PC (polycarbonate), PPS (polyphenylene sulfide), liquid crystal resin and the like.

When the holder is formed by a molding process, the value of the thermal expansion coefficient in a flow direction of the resin composition inside a molding die may differ the value of the thermal expansion coefficient in a direction orthogonal to the flow direction. In this case, it is only necessary that at least one of the thermal expansion coefficients of the holder in the flow direction or in the direction orthogonal to the flow direction falls within the range between the thermal expansion coefficient of the holding frame and the thermal expansion coefficient of the color-combining optical element.

According to the above aspect of the present invention, since the holder is a molded article obtained by molding a resin composition of a fiber filler and a resin, the holder can be easily produced by injection molding and the like, thereby greatly reducing the production cost. Further, since the holder can be obtained by molding a resin composition containing the resin filler, the strength of the holder can be maintained and the mechanical strength of the optical device can be kept. Further, the weight of the holder can be reduced, so that the weight of the optical device and, consequently, the optical apparatus using the optical device can be reduced. Furthermore, with the use of a light-shielding material as the resin composition of the resin filler and the resin, an extra light beam incident on the color-combining optical element from a part other than the image formation area of the optical modulator can be blocked. And the light reflected by the color-combining optical element is not again reflected toward the color-combining optical element. Accordingly, the extra light can be shielded and the deterioration of contrast on account of stray light can be prevented.

In the above aspect of the present invention, the resin composition may preferably contain 50 weight % or less of the fiber filler.

According to the above aspect of the present invention, since the 50 or less weight % of fiber filler is contained in the resin composition, the thermal expansion coefficient lying midway between thermal expansion coefficients of the holding frame and the color-combining optical element can be maintained and the position shift of the optical modulator can be efficiently prevented.

For instance, when the color-combining optical element is constructed of a material having relatively low thermal expansion coefficient and more than 50 weight % fiber filler such as glass fiber is filled in the resin composition, the thermal expansion coefficient becomes close to that of the color-combining optical element. In other words, the difference of the thermal expansion coefficient between the holding frame and the holder is magnified to generate a great thermal stress between the holding frame and the holder, so that the position shift of the optical modulator cannot be prevented.

In the above aspect of the present invention, holes may preferably be formed at least two parts of the holding frame, and the holder may preferably have a rectangular plate body having an opening at a position corresponding to the opening of the holding frame and a pin projecting from the rectangular plate body to be inserted to the hole of the holding frame.

According to the above arrangement, since the pin for fixing the holding frame is provided on the holder, the number of the components can be reduced and the structure can be simplified to facilitate the production thereof as compared to a conventional POP structure. Further, since the heat on the optical modulator can be released through the pin, the heat-radiation performance of the optical modulator can be improved.

In the above aspect of the present invention, a distal end of the pin may preferably be thinner than a base end thereof.

Further, in the above aspect of the present invention, the holding frame and the holder may preferably be fixed by a photo-curing adhesive.

According to the above arrangement, since the distal end of the pin is thinner than the base end of the pin, when a photo-curing adhesive is used for fixing the holding frame and the holder, the adhesive can be cured within a short time by irradiating a light beam from the distal side of the pin. Accordingly, the production efficiency of the optical device and, consequently, the optical apparatus using the optical device can be improved.

In the above aspect of the present invention, a notch for absorbing a deformation result from a thermal stress applied on the rectangular plate body may preferably be formed on the rectangular plate body.

According to the above arrangement, even when the thermal stress is applied on the holder by the heat generated on the optical device, the notch absorbs the deformation of the outer profile of the holder. Accordingly, the position shift of the optical modulator on account of the heat can be prevented.

A projector according to another aspect of the present invention has: the above optical device; and a projection lens for projecting an image formed by the optical device.

According to the above aspect of the present invention, since the above-described optical device is provided, the position of the optical modulator after the position thereof being adjusted can be appropriately kept, so that the pixel shift of the projected image can be avoided and high-quality image can be obtained.

BEST MODE FOR CARRYING OUT THE INVENTION

An embodiment of the present invention will be described below with reference to attached drawings.

(1) Exterior Arrangement

Figure 1:
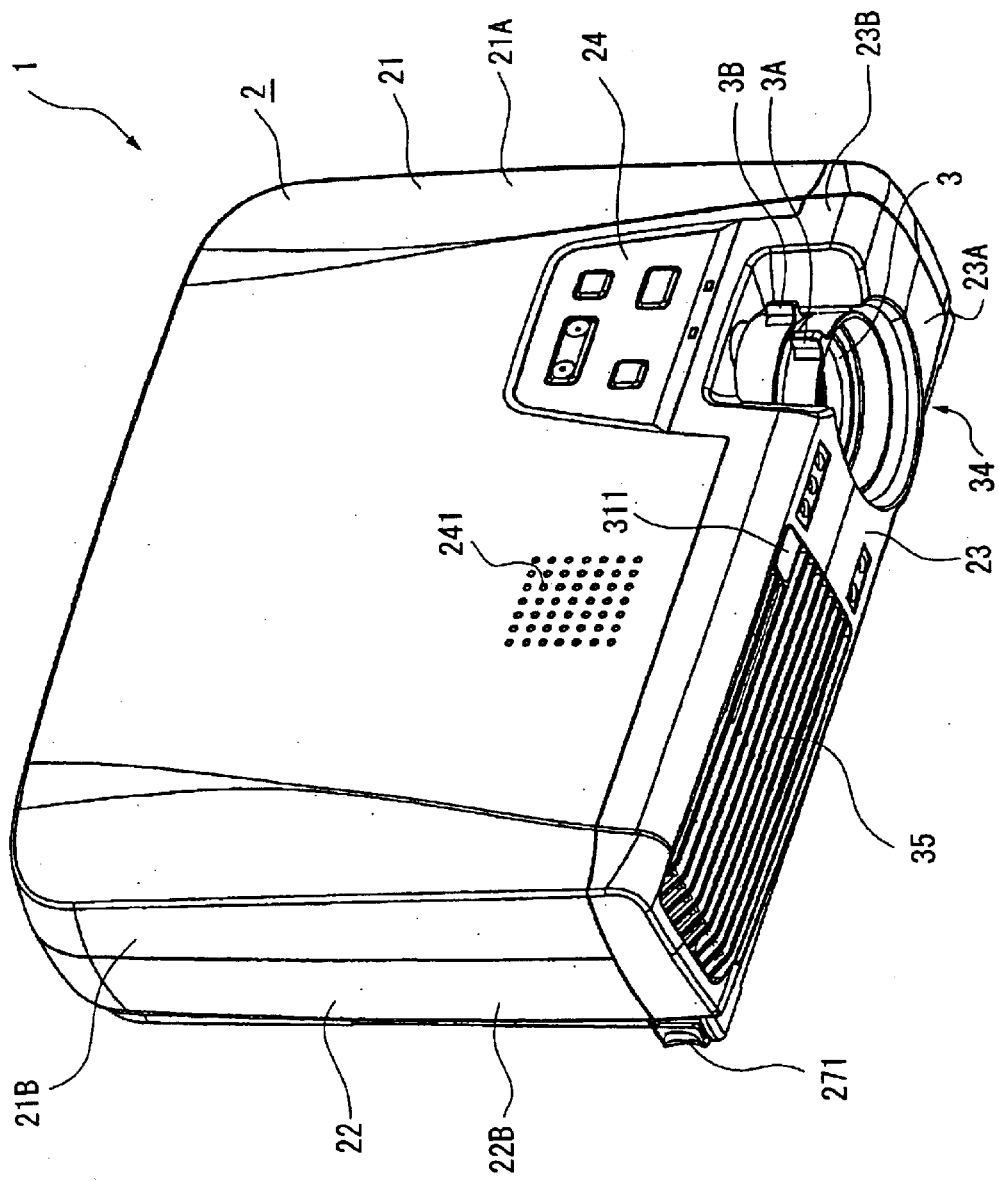
FIG. 1 is a schematic perspective view showing an exterior arrangement of a projector according to an embodiment of the present invention.
Figure 2:
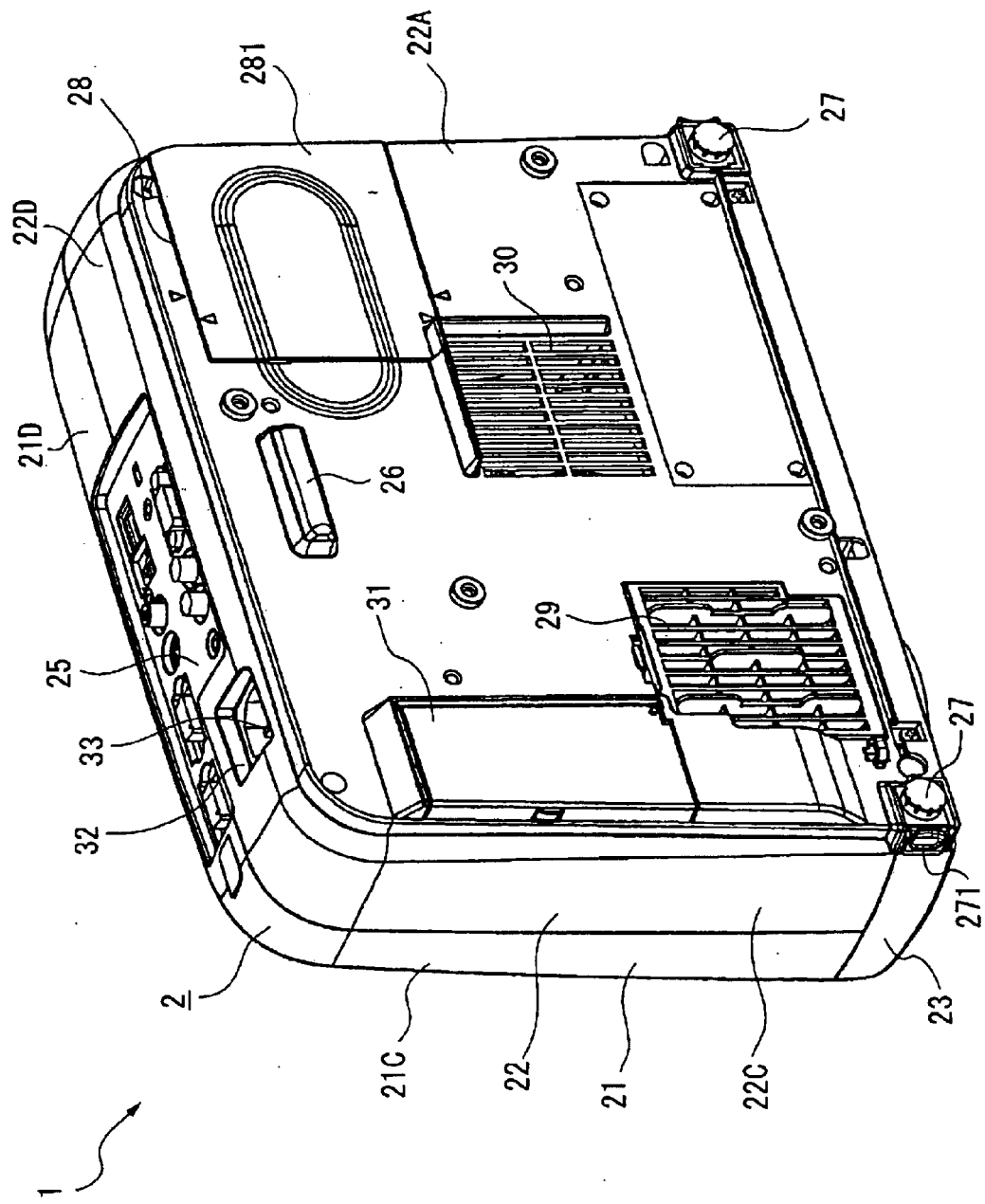
FIG. 2 is another schematic perspective view showing the exterior arrangement of the projector of the aforesaid embodiment.

FIGS. 1 and 2 show a projector according to an embodiment of the present invention, where FIG. 1 is a perspective view seen from the upper front side and FIG. 2 is a perspective view seen from the lower rear side.

The projector 1 is an optical apparatus that modulates a light beam irradiated by a light source in accordance with image information to project on a projection surface such as a screen in an enlarged manner, which has an exterior case 2 accommodating an apparatus body including a below-described optical engine and a projection lens 3 exposed from the exterior case 2.

The projection lens 3 works as a projection optical system that enlarges and projects the optical image formed by modulating the light beam irradiated by the light source with a liquid crystal panel (optical modulator: described below), which is a lens set accommodating a plurality of lenses inside a cylindrical body.

The exterior case 2 (casing) has a rectangular parallelepiped shape having wider width in a direction orthogonal to a projection direction than the dimension in the projection direction, which includes an upper case 21 covering an upper part of the apparatus body, a lower case 22 covering a lower part of the apparatus body, and a front case 23 covering a front side of the apparatus body. The cases 21 to 23 are synthetic-resin integral molded articles made by injection molding and the like.

The upper case 21 has an upper side 21A covering the upper part of the apparatus body, lateral sides 21B and 21C extending downward from the ends of the upper side 21A in width direction, and a rear side 21D extending downward from a rear end of the upper side 21A.

An operation panel 24 for actuating and adjusting the projector 1 is provided on the front side (in the projection direction) of the upper side 21A. The operation panel 24 includes a plurality of switches such as a power switch and adjustment switches for adjusting image and sound, the adjustment switches etc. on the operation panel 24 being operated while projecting an image by the projector 1 to adjust the image and sound volume etc.

A plurality of holes 241 are formed adjacent to the operation panel 24 on the upper side 21A, under which, though not shown, a sound-outputting speaker is accommodated.

The operation panel 24 and the speaker are electrically connected with a control board (described below) of the apparatus body and the operation signal from the operation panel 24 is processed by the control board.

A recess cut toward the upper side 21A is formed approximately at the center of the rear side 21D, and connectors 25 provided on a below-described interface board connected to the control board are exposed on the recess.

The lower case 22 is approximately symmetrical with the upper case 21 with reference to the engaging surface therebetween, which includes a bottom side 22A, lateral sides 22B and 22C and a rear side 22D. The upper end of the lateral sides 22B and 22C and the rear side 22D are engaged with the lower end of the lateral sides 21B and 21C and the rear side 21D of the upper case 21 to form the lateral side and the rear side of the exterior case 2.

A fixed leg 26 is provided on the bottom side 22A approximately at the center of the rear end side of the projector 1 and an adjustment leg 27 is provided on both sides (in width direction) of the front side.

The adjustment leg 27 has a shaft member projecting in advanceable and retractable manner in an out-plane direction from the bottom side 22A, and the shaft member body is accommodated inside the exterior case 2. The advancement and retraction amount of the adjustment legs 27 relative to the bottom side 22A can be adjusted by operating an adjustment button 271 provided on the lateral side of the projector 1.

Accordingly, the vertical position of the projected image irradiated by the projector 1 can be adjusted and the projected image can be formed at an appropriate position.

Openings 28, 29 and 30 intercommunicating with the inside of the exterior case 2 are formed on the bottom side 22A.

The opening 28 is for attaching and detaching a light source device including the light source of the projector 1, which is usually covered with a lamp cover 281.

The openings 29 and 30 are slitted openings.

The opening 29 is an intake opening for drawing in a cooling air for cooling the optical device including the liquid crystal panel (optical modulator) for modulating the light beam irradiated by the light source lamp in accordance with image information.

The opening 30 is an intake opening for drawing in a cooling air for cooling a power supply unit and a light source driving circuit of the apparatus body of the projector 1.

Incidentally, since the openings 29 and 30 are constantly intercommunicated with the inside of the projector 1 through the slitted opening portion, dust-proof filters are provided on the inside of the respective openings 29 and 30 to prevent the invasion of the dust etc. However, the dust-proof filter may not be provided on the opening 30.

A lid 31 is attached to the bottom side 22A in a turnable manner, and a remote controller for remotely operating the projector 1 is accommodated inside the lid 31. Incidentally, the remote controller (not shown) has switches similar to the power switch and the adjustment switch provided on the above-described operation panel 24. When the remote controller is operated, an infrared radiation signal in accordance with the operation is transmitted from the remote controller, which is received by a light-receiver 311 provided on the front and rear sides of the exterior case 2 to be processed by the control board.

As in the upper case 21, a recess cut to the bottom side 22A is formed on the rear side 22D to expose the connectors 25 provided on the interface board and an opening 32 is formed around an end thereof, the opening 32 exposing an inlet connector 33. The inlet connector 33 is a terminal for supplying electric power from an external power source to the projector 1, which is electrically connected with the below-described power supply unit.

The front case 23 has a front side 23A and an upper side 23B and is engaged with the distal sides (in projection direction) of the above-described upper case 21 and the lower case 22 at the rear end (in projection direction) of the upper side 23B.

The front side 23A has an approximately circular opening 34 for exposing the projection lens 3 and an opening 35 constructed of a plurality of slits formed adjacent to the opening 34.

The upper side of the opening 34 is further cut to expose a part of the lens barrel of the projection lens 3 so that knobs 3A and 3B provided on the circumference of the lens barrel for adjusting zoom and focus of the projection lens 3 can be operated from the outside.

The opening 35 is an exhaust opening for exhausting the air having cooled the apparatus body, through which the air having cooled the optical system, the control system, the power supply unit and the lamp drive unit of the below-described projector 1 is discharged in the projection direction of the projector 1.

(2) Interior Arrangement

Figure 3:
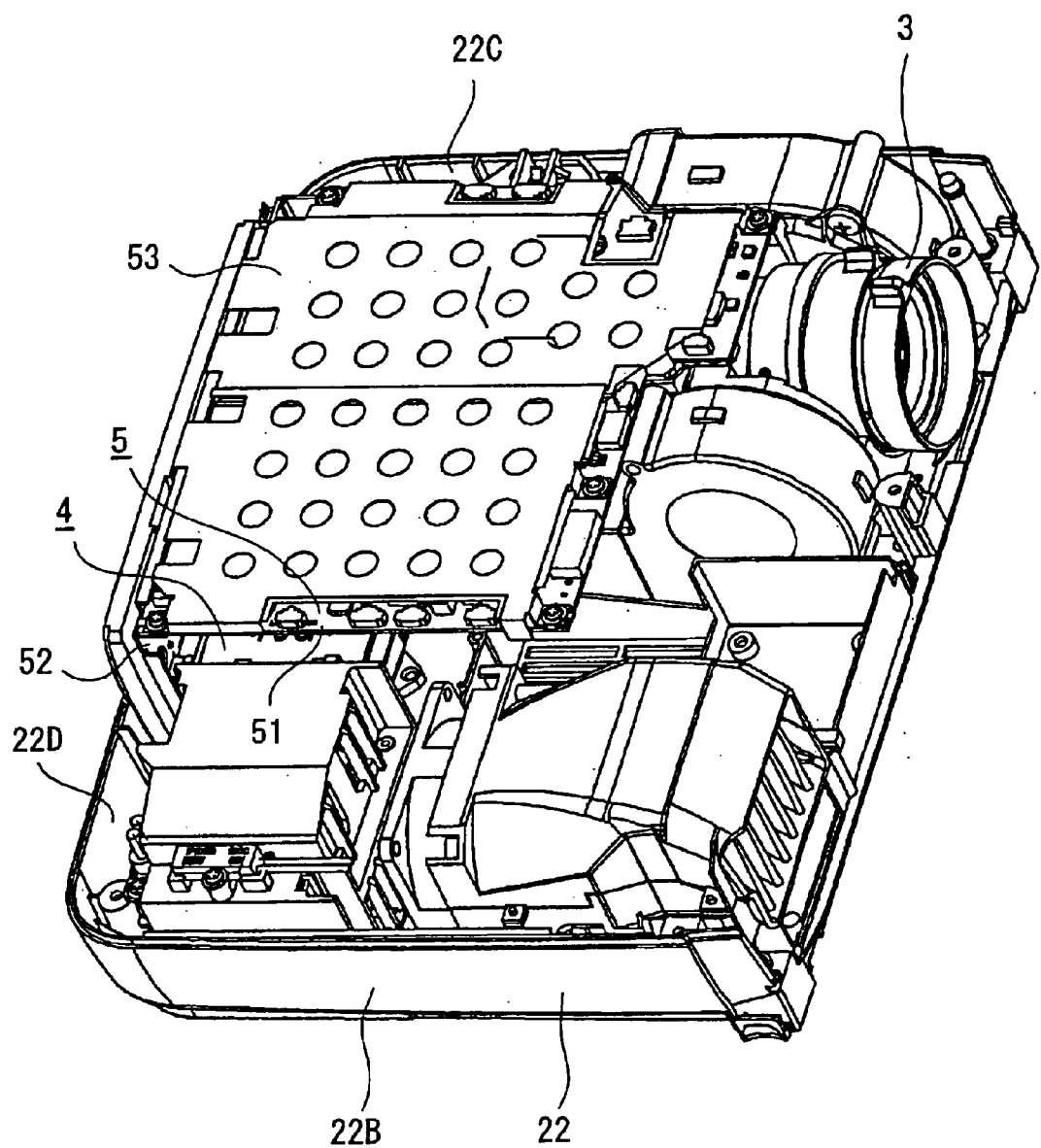
FIG. 3 is a schematic perspective view showing an interior arrangement of the projector of the aforesaid embodiment.
Figure 4:
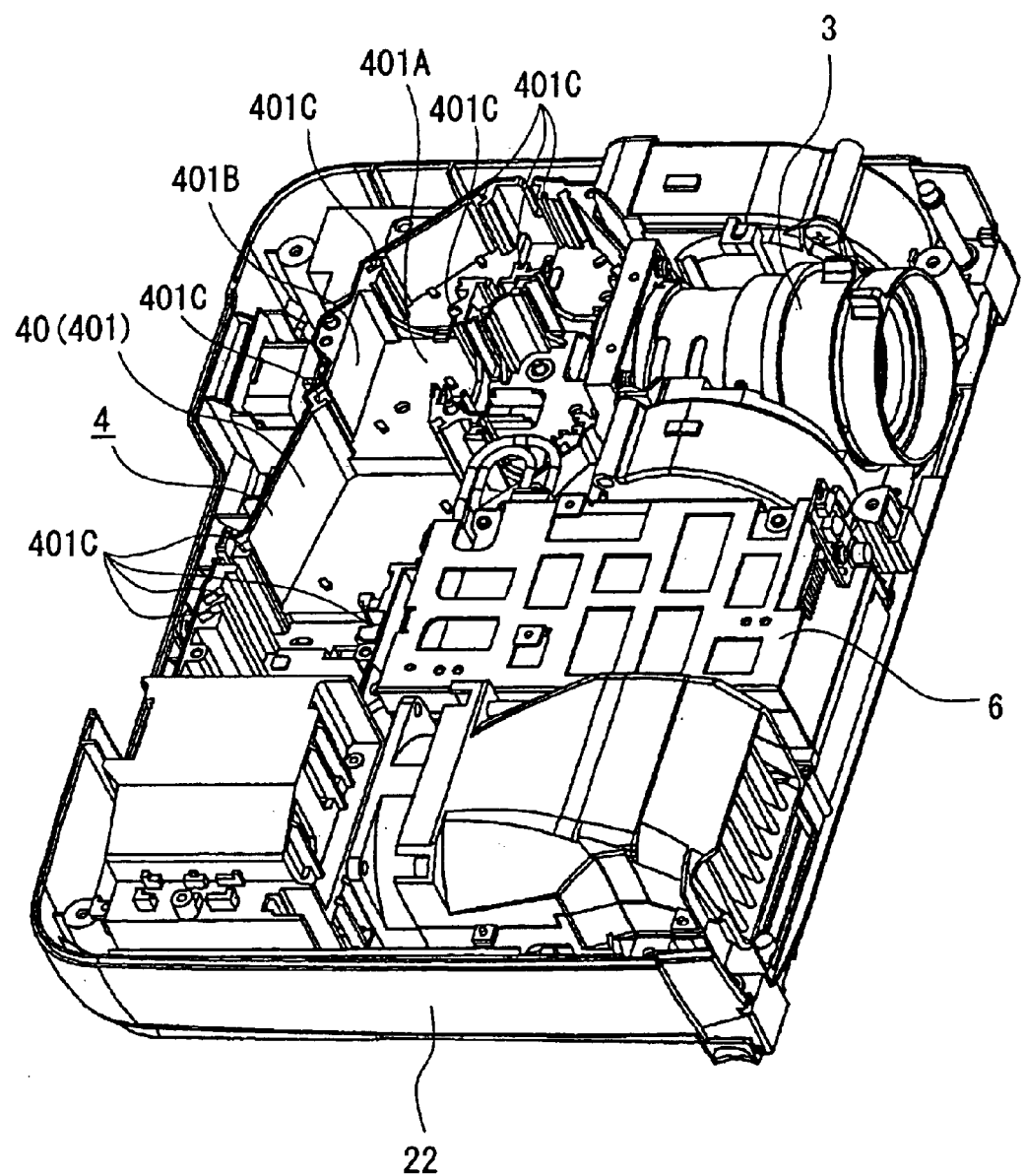
FIG. 4 is another schematic perspective view showing the interior arrangement of the projector of the aforesaid embodiment.
Figure 5:
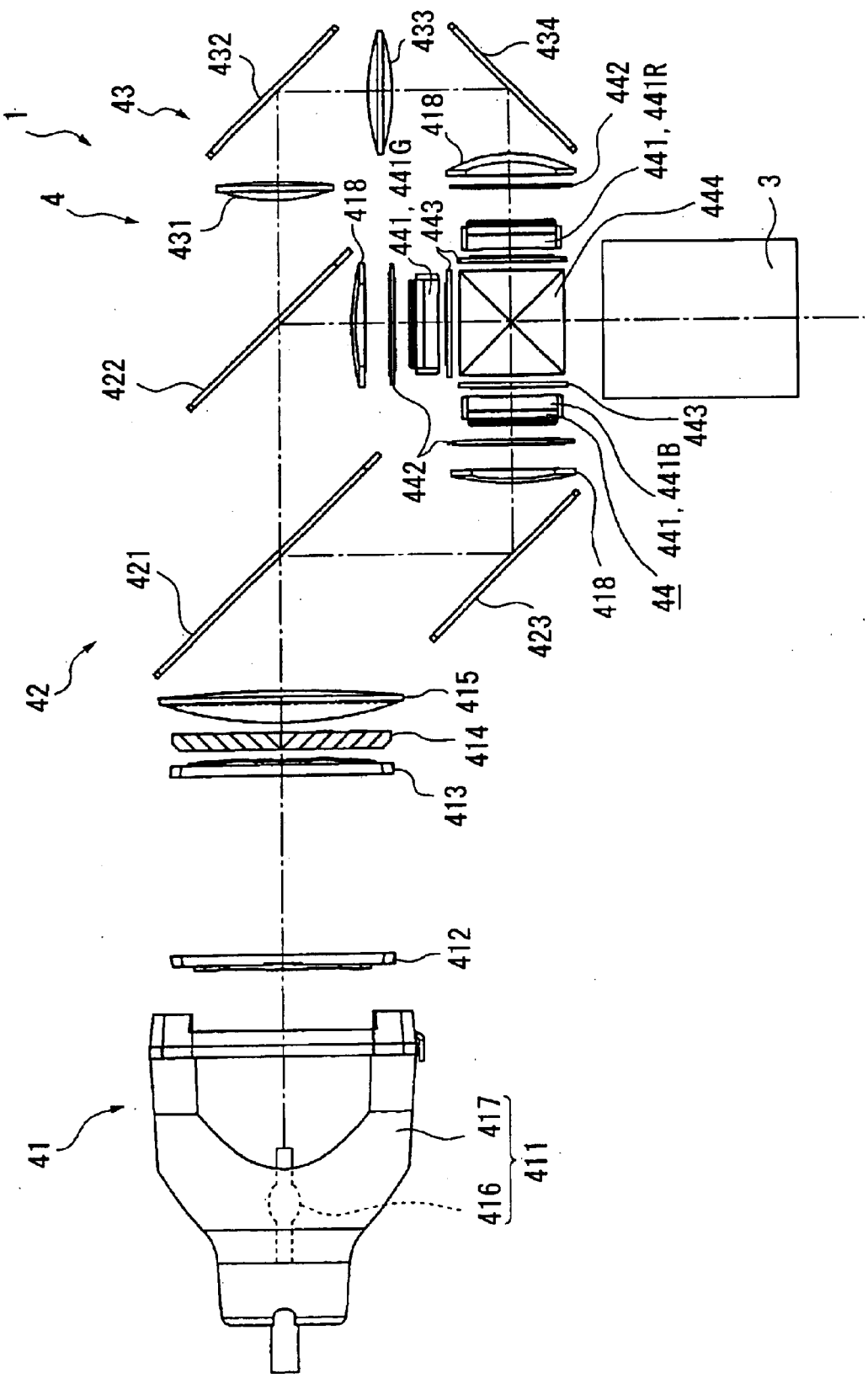
FIG. 5 is a schematic illustration showing an arrangement of an optical system of the projector of the aforesaid embodiment.

As shown in FIGS. 3 to 5, an apparatus body of the projector 1 is accommodated inside the exterior case 2, the apparatus body including an optical unit 4, a control board 5 as shown in FIG. 3 and a power supply block 6 as shown in FIG. 4.

(2-1) Structure of Optical Unit 4

The optical unit 4 (optical engine) modulates the light beam irradiated by a light source in accordance with image information to form an optical image and casts a projected image on a screen through the projection lens 3, which is constructed by installing the light source and various optical components inside an optical component casing (a light guide 40) shown in FIG. 4.

The light guide 40 is composed of a lower light guide 401 and an upper light guide (not shown in FIG. 4), both of the light guides being a synthetic resin molded article produced by injection molding or the like.

The lower light guide 401 is a container with an upper side being opened, the lower light guide 401 having a bottom portion 401A and a sidewall 401B for accommodating the optical components, and a plurality of grooves 401C are provided on the sidewall 401B. Various optical components of the optical unit 4 are attached to the grooves 401C, so that the respective optical components of the optical unit 4 are accurately disposed on an illumination optical axis defined in the light guide 40. The upper light guide has a planar shape corresponding to the lower light guide 401, which is a lid covering the upper side of the lower light guide 401.

A front wall with a circular opening formed thereon is provided on a light-irradiation end of the bottom portion 401A of the lower light guide 401, and the base end of the projection lens 3 is attached and fixed to the front wall.

As shown in FIG. 5, the inside of the light guide 40 are functionally separated as an integrator illuminating optical system 41, a color-separating optical system 42, a relay optical system 43 and an optical device 44 integrating a light-modulating optical system and a color-combining optical system. Incidentally, the optical unit 4 of the present embodiment is used for a three-plate projector, which is a spatial color-separating optical unit for separating the white light irradiated by a light source into three color lights inside the light guide 40.

The integrator illuminating optical system 41 is an optical system for equalizing the illuminance of the light beam irradiated by the light source on a plane orthogonal to the illumination optical axis, which includes a light source 411, a first lens array 412, a second lens array 413, a polarization converter 414, and a superposing lens 415.

The light source 411 has a light source lamp 416 as a radial light source and a reflector 417, where the radial light beam irradiated by the light source lamp 416 is reflected by the reflector 417 to be irradiated to the outside as an approximately parallel light beam. Though a high-pressure mercury lamp is used as the light source lamp 416 in the present embodiment, a metal halide lamp or a halogen lamp may be used. Though a parabolic mirror is used as the reflector 417, an arrangement in which a parallelizing concave lens is disposed on an irradiation side of a reflector of an ellipsoidal mirror may alternatively be used.

The first lens array 412 has small lenses arranged in a matrix, the lenses having approximately rectangular profile seen in the illumination optical axis direction. The respective small lenses separates the light beam irradiated by the light source lamp 416 into sub-beams and irradiates in the illumination optical axis direction. The profiles of the respective small lenses are arranged similar to the profile of the image formation area of below-described liquid crystal panel 441. For instance, when the aspect ratio (ratio of horizontal and vertical dimensions) of the image formation area of the liquid crystal panel 441 is 4:3, the aspect ratio of the respective lenses is also set as 4:3.

The second lens array 413 is arranged in approximately the same manner as the first lens array 412, which includes small lenses arranged in a matrix. The second lens array 413 superposes the image of the respective small lenses of the first lens array 412 onto the liquid crystal panel 441 together with the superposing lens 415.

The polarization converter 414 converts the light beam from the second lens array 413 into a one type of polarized light, which enhances the light utilization efficiency of the optical device 44.

Specifically, the respective sub-beams converted into one type of polarized light by the polarization converter 414 are substantially superposed on the liquid crystal panel 441 of the optical device 44 by the superposing lens 415. Since only one type of polarized light can be used in a projector using the polarized-light-modulating liquid crystal panel 441, approximately half of the light beam from the light source 416 emitting random polarized lights is not utilized.

Accordingly, with the use of the polarization converter 414, the light beam irradiated by the light source lamp 416 is converted into substantially one type of polarized light to enhance the light utilization efficiency of the optical device 44. Incidentally, such polarization converter 414 is disclosed in, for instance, Japanese Patent Laid-Open Publication H08-304739.

The color-separating optical system 42 has two dichroic mirrors 421 and 422 and a reflection mirror 423 and separates the plurality of sub-beams irradiated by the integrator illuminating optical system 41 into three color lights of red (R), green (G) and blue (B) by the dichroic mirrors 421 and 422.

The relay optical system 43 has an incident-side lens 431, a relay lens 433 and reflection mirrors 432 and 434, which introduces the red light (color light) separated by the color-separating optical system 42 to the liquid crystal panel 441R.

In the present arrangement, the dichroic mirror 421 of the color-separating optical system 42 transmits the red light component and the green light component of the light beam irradiated by the integrator illuminating optical system 41 and reflects the blue light component. The blue light reflected by the dichroic mirror 421 is reflected by the reflection mirror 423 to reach the liquid crystal panel 441B for blue color through a field lens 418. The field lens 418 converts the respective sub-beams irradiated by the second lens array 413 into a light beam parallel to the central axis (main beam) thereof. The field lenses 418 provided on the light-incident side of the other liquid crystal panels 441G and 441R work in the same manner.

In the red light component and the green light component of the light beam transmitted through the dichroic mirror 421, the green light is reflected by the dichroic mirror 422 and reaches to the liquid crystal panel 441G for green color through the field lens 418. On the other hand, the red light is transmitted through the dichroic mirror 422 through the relay optical system 43 to reaches to the liquid crystal panel 441R for red color.

Incidentally, the relay optical system 43 is used for the red light in order to avoid the deterioration of the light utilization efficiency on account of light dispersion etc. caused by longer dimension of the optical path of the red light than the length of the other color light, in other words, in order to directly transmit the sub-beams incident on the incident-side lens 431 to the field lens 418. Incidentally, though the red light out of the three color lights is introduced to the relay optical system 43, the blue light may alternatively introduced to the relay optical system 43, for instance.

The optical device 444 modulates the incident light beam in accordance with image information to form a color image, which includes three incident-side polarization plates 442 onto which the respective color lights separated by the color-separating optical system 42 are incident, the liquid crystal panels 441R, 441G and 441B (optical modulator) disposed on the downstream of the respective incident-side polarization plates 442, irradiation-side polarization plates 443 disposed on the downstream of the respective liquid crystal panels 441R, 441G and 441B, and a cross dichroic prism 444 (color-combining optical element).

The liquid crystal panels 441R, 441G and 441B use, for instance, polycrystalline silicon TFT as a switching element, which is constructed by, though not illustrated, accommodating a panel body having a pair of transparent substrates sealing a liquid crystal therebetween in a holding frame.

In the optical device 44, the respective color lights separated by the color-separating optical system 42 are modulated by the three liquid crystal panels 441R, 441G and 441B, the incident-side polarization plate 442 and the irradiation-side polarization plate 443 in accordance with image information to form an optical image.

The incident-side polarization plate 442 transmits a polarized light in a predetermined direction out of the color lights separated by the color-separating optical system 42 and absorbs the other light beam, which is constructed by attaching a polarization film on a substrate such as a sapphire glass. Alternatively, without using a substrate, a polarization film may be adhered on the field lens 418.

The incident-side polarization plate 442 is arranged in approximately the same manner as the incident-side polarization plate 442, which transmits, out of the light beam irradiated by the liquid crystal panels 441 (441R, 441G and 441B), only the polarized light in a predetermined direction and absorbs the other light beam. Alternatively, without using a substrate, a polarization film may be adhered on the cross dichroic prism 444.

The incident-side polarization plate 442 and the irradiation-side polarization plate 443 are arranged so that the directions of the polarization axis thereof are orthogonal with each other.

The cross dichroic prism 444 combines the optical image irradiated by the irradiation-side polarization plate 443 and modulated for each color light to form a color image.

A dielectric multi-layered film for reflecting the red light and another dielectric multi-layered film for reflecting the blue light are provided in the cross dichroic prism 444 along the boundaries of four right-angle prisms in an approximately X-shape, the dielectric multi-layered film combining the three color lights.

The optical device 44 is integrated by adhering a panel fixing plate (holder) on the respective light-incident sides of the cross dichroic prism 444, the panel fixing plate having pins projecting in an out-plane direction on the four corners of a rectangular plate body, and inserting the pins into holes formed on the holding frame of the liquid crystal panels 441R, 441G and 441B.

The integrated optical device 44 is disposed on the upstream of the optical path of the projection lens 3 of the above-described light guide 40 and is screwed on the bottom portion of the lower light guide 401.

Incidentally, the details of the structure of the optical device 44 will be described below.

(2-2) Structure of Control Board 5

As shown in FIG. 3, the control board 5 has a main board 51 covering the upper side of the optical unit 4 on which a processor and an IC for driving the liquid crystal panel 441 are installed, and an interface board 52 connected with the rear end of the main board 51 and vertically provided on the rear sides of the rear sides 21D and 22D of the exterior case 2.

The above-described connectors 25 are installed on the rear side of the interface board 52, and the image information inputted through the connectors 25 are outputted to the main board 51 through the interface board 52.

The processor on the main board 51 processes the inputted image information and, subsequently, outputs a control command to the liquid-crystal-panel driving IC. The driving IC generates a drive signal based on the control command to drive the liquid crystal panel 441 to modulate the light beam in accordance with the image information to form an optical image.

The main board 51 is covered with a metal plate 53 produced by bending a punching metal, the metal plate preventing EMI (electromagnetic interference) by the circuit elements and the like on the main board 51.

(2-3) Structure of Power Supply Block 6

Figure 6:
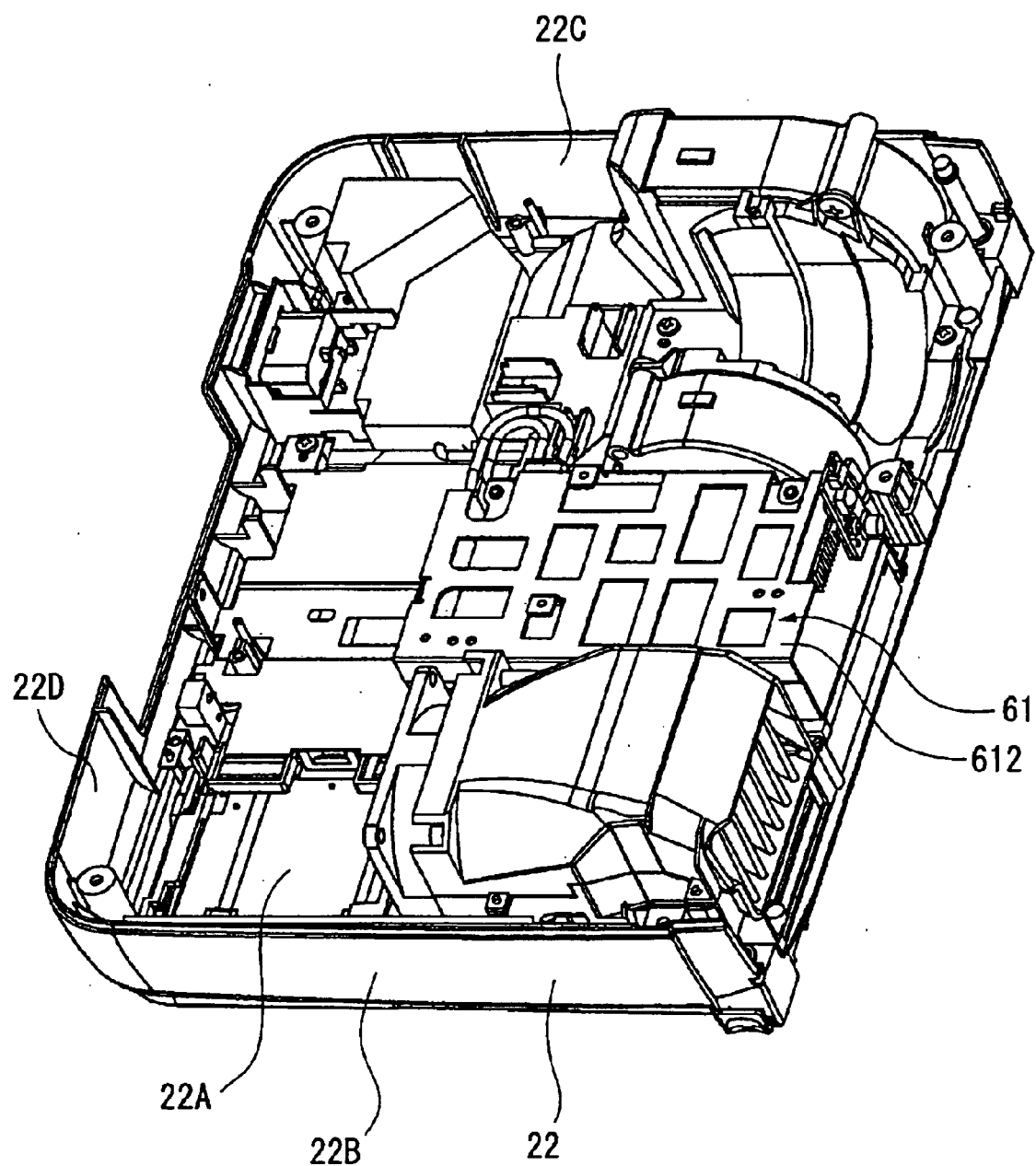
FIG. 6 is a schematic perspective view showing an arrangement of a power supply of the aforesaid embodiment.
Figure 7:
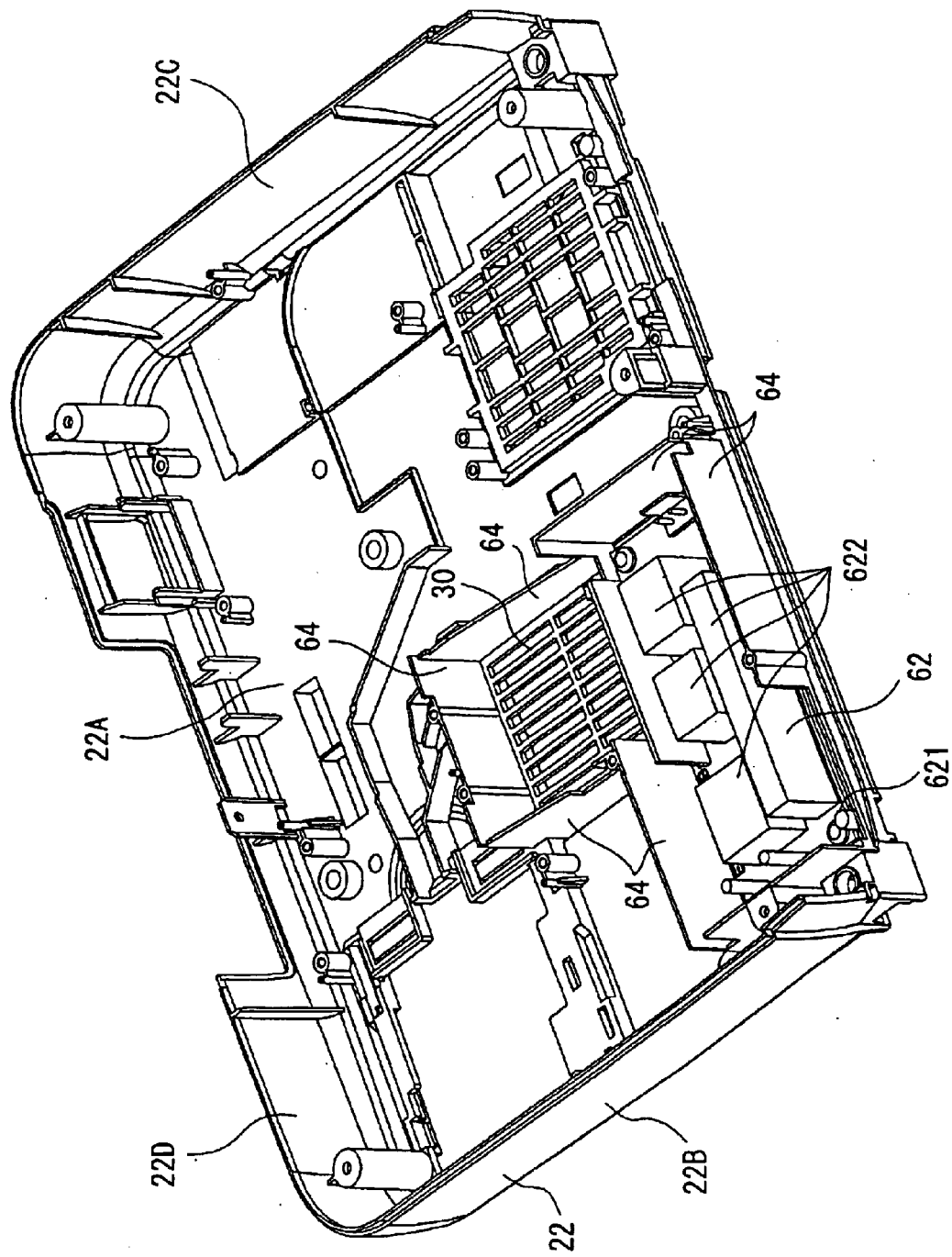
FIG. 7 is a schematic perspective view showing an arrangement of a light source driving circuit of the aforesaid embodiment.

The power supply block 6 has a power supply unit 61 having a power supply circuit as shown in FIG. 6, and a lamp driving unit 62 disposed under the power supply unit 61 and having a light source driving circuit as shown in FIG. 7.

The power supply unit 61 supplies the electric power supplied from the outside through a power cable (not shown) connected to the above-described inlet connector 33 to the lamp driving unit 62 and the control board 5.

The power supply unit 61 has a substrate body (not shown) disposed thereinside and a metal cylindrical body 612 surrounding the substrate body. The cylindrical body 612 prevents the EMI in the same manner as the metal plate 53 of the control board 5 while working as a wind guide for flowing the cooling air.

An intake fan (not shown) is attached to the base end of the cylindrical body 612, from which the cooling air is drawn in from the outside through the opening 30 (see FIGS. 2 and 7), and the taken cooling air is supplied to the inside of the power supply block 6.

The lamp driving unit 62 is a converter for supplying an electric power to the above-described light source 511 with a stable voltage, where the commercial alternating current inputted by the power supply unit 61 is rectified and converted by the lamp driving unit 62 to be supplied to the light source 411 as a direct-current or an alternating rectangular-wave current.

As shown in FIG. 7, the lamp driving unit 62 has a substrate 621 fixed on the bottom side 22A of the lower case 22 by a resin rivet or a screw and various circuit elements 622 provided on the upper side of the substrate 622, the substrate 621 extending in a direction orthogonal to the extending direction of the power supply unit 61.

The lamp driving unit 62 is surrounded by a plurality of plate bodies 64 vertically mounted on the inner side of the bottom side 22A of the lower case 22. The plurality of plate bodies 64 also surround the intake opening 30 formed on the bottom side 22A, so that the space around the opening 30 and the space in which the lamp driving unit 62 is disposed are partitioned by the plurality of plate bodies 64 from the other space in the lower case 22.

Incidentally, the plurality of plate bodies 64 are integrally molded simultaneously with injection-molding of the lower case 22.

The power supply unit 61 is screwed and fixed on the lower case 22.

(3) Structure of Optical Device 44

Figure 8:
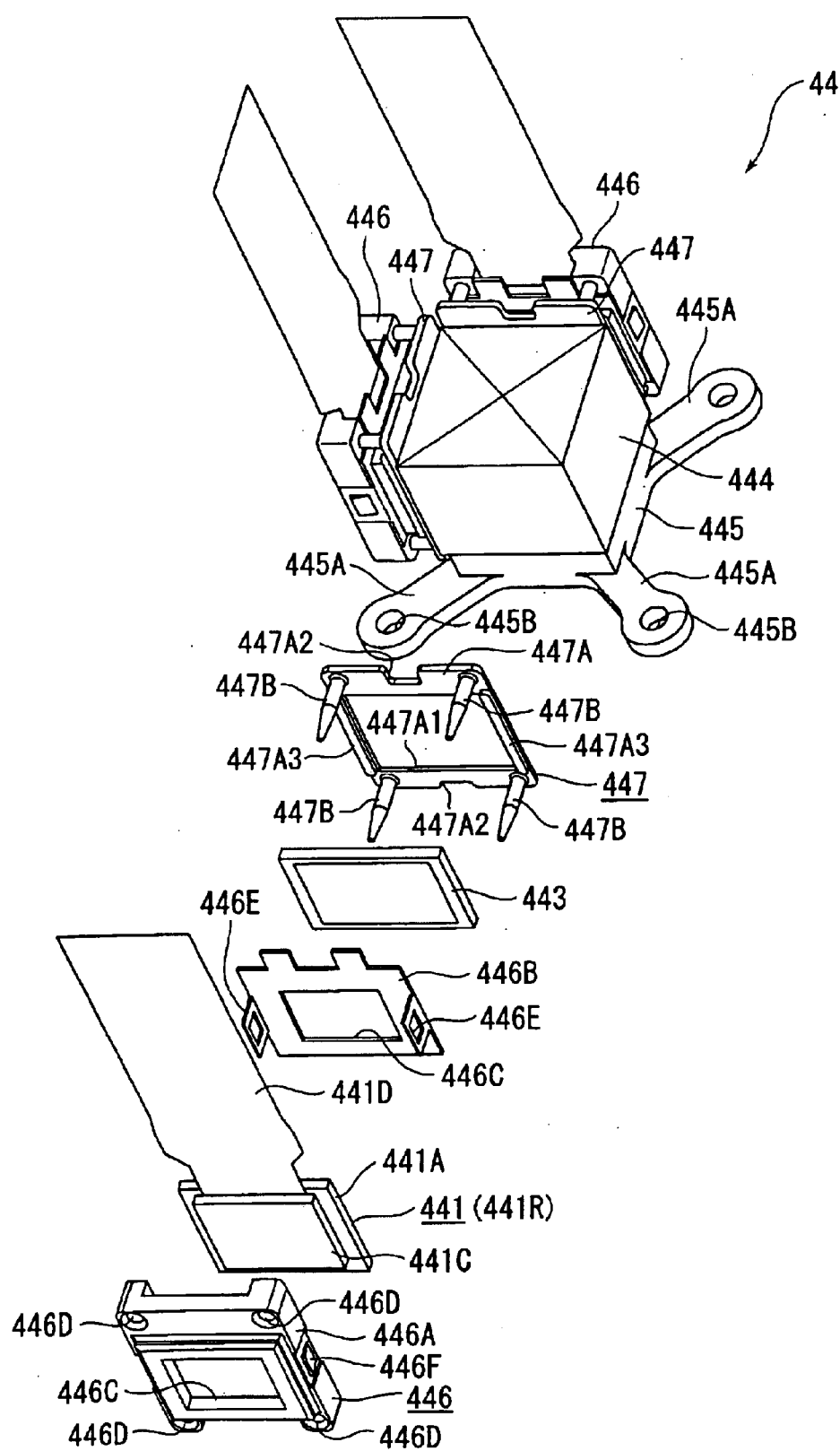
FIG. 8 is a perspective view showing an arrangement of an optical device of the aforesaid embodiment.

FIG. 8 is an exploded perspective view showing a structure of the optical device 44. Incidentally, only the side on which the liquid crystal panel 441R is disposed is shown in an exploded manner.

The optical device has a base 445, a holding frame 446, and a panel fixing plate 447 (holder) as well as the above-described liquid crystal panel 441, the incident-side polarization plate 442, the irradiation-side polarization plate 443 and the cross dichroic prism 444. The holding frame 446 accommodates the liquid crystal panel 441 and is integrally fixed on the light-incident side of the cross dichroic prism 444 through the panel fixing plate 447. Incidentally, the incident-side polarization plate 442 is fixed on the light guide 40.

The four right-angle prisms of the cross dichroic prism 444 may be constructed of an optical glass, sapphire or quartz crystal etc.

Table 1 shows a thermal expansion coefficient of various materials that can be used for the cross dichroic prism 444.

TABLE 1

| Material | Thermal Expansion Coefficient ($\times 10^{-5}$/K) |
|---|---|
| Optical glass (BK-7) | 0.71 |
| Sapphire | 0.53 |
| Quartz Crystal | 0.68 (in optic axis direction) 1.22 (in a direction orthogonal to the optic axis) |

As shown in FIG. 8, the liquid crystal panel 441 is constructed by sealing a liquid crystal between a drive substrate 441A (a substrate on which a plurality of line-shaped electrodes, pixel-constituting electrodes and TFT elements disposed between and electrically connected with the above electrodes are provided, for instance) and an opposing substrate 441C (e.g. a substrate on which a common electrode is formed). A control cable 441D extends from between the substrates 441A and 441C. Incidentally, a dust-proof plate for shifting the position of the panel surface of the liquid crystal panel 441 from the back focus position of the projection lens 3 to make dusts adhered on the surface of the panel less obvious may be provided on the substrate 441A or 441C.

The base 445 is fixed on the lower side of the cross dichroic prism 444 to fix the integrated optical device 44 on the lower light guide 401. The base 445 is an approximately rectangular plate member, which has an extension 445A extending from the four corners thereof. A hole 445B is formed on the distal end of the extension 445A and a hole (not shown) formed on the bottom portion 401A of the lower light guide 401 and the hole 445B are screwed to fix the optical device 44 to the lower light guide 401. The rectangular portion of the base 445 is slightly smaller than the profile of the outer edge of the cross dichroic prism 444. Accordingly, when the panel fixing plate 447 is fixed on the side of the cross dichroic prism 444, the base 445 and the panel fixing plate 447 are not interfered with each other.

The holding frame 446 accommodates the liquid crystal panel 441. The holding frame 446 has, as shown in FIG. 8, a concave frame body 446A having an accommodating portion 446A1 (see FIG. 11) for accommodating the liquid crystal panel 441 and a support plate 446B engaged with the concave frame body 446A and shielding the light irradiated on the accommodated liquid crystal panel 441. The holding frame 446 also has an opening 446C at a position corresponding to the panel surface of the accommodated liquid crystal panel 441. Further, holes 446D are formed on the four corners of the holding frame 446. The concave frame body 446A and the support plate 446B are fixed by engaging hooks 446E provided on the right and left sides of the support plate 446B and hook engaging portions 446F provided on the corresponding part of the concave frame body 446A as shown in FIG. 8.

The liquid crystal panel 441 is exposed at the opening 446C of the holding frame 446 to form an image formation area at the exposed portion. In other words, the color lights R, G and B are introduced on the portion of the liquid crystal panel 441 to form an optical image in accordance with the image information.

Further, a light-shielding film (not shown) is provided on the light-irradiation side of the support plate 446B, so that the light reflected by the cross dichroic prism is not reflected again toward the cross dichroic prism 444 to prevent deterioration of the contrast on account of stray light.

The hole 446D may not be positioned on the corner of the holding frame 446. The number of the holes 446D may not be four as long as two or more holes are provided.

The panel fixing plate 447 holds and fixes the holding frame 446 for accommodating the liquid crystal panel 441. As shown in FIG. 8, the panel fixing plate 447 has a rectangular plate body 447A and pins 447B projecting from the four corners of the rectangular plate body 447A. The pin 447B may not be positioned on the corner of the rectangular plate body 447A. The number of the pin 447B may not be four as long as two or more pins are provided. In other words, the pin may be arranged in any manner corresponding to the hole 446D of the holding frame 446 in accordance with the design thereof.

The panel fixing plate 447 is interposed between the holding frame 446 and the cross dichroic prism 444. The panel fixing plate 447 and the cross dichroic prism 444 are fixed by adhering the side of the panel fixing plate 447 opposite to the pin 447B on the light-irradiation side of the cross dichroic prism 444. The panel fixing plate 447 and the holding frame 446 are mutually adhered and fixed through the pin 447B of the panel fixing plate 447 and the hole 446D of the holding frame 446.

The rectangular plate body 447A has an approximately rectangular opening 447A1 corresponding to the image formation area of the liquid crystal panel 441. Further, the rectangular plate body 447A is provided with a notch 447A2 extending orthogonal to the upper and lower edge thereof from the outer edge to the opening 447A1. Furthermore, the rectangular plate body 447A is provided with a support surface 447A3 for the irradiation-side polarization plate 443 to be attached along the right and left edges thereof.

The pin 447B has an approximately conic shape tapered from the base end to the distal end. The portion of the pin 447B rising from the rectangular plate body 447A has a diameter greater than the hole 446D formed on the holding frame 446, so that a gap is secured between the liquid crystal panel 441 and the panel fixing plate 447 when the liquid crystal panel 441 is attached. Without such arrangement, in other words, when the diameter of the rising portion of the pin 447B is approximately the same as the hole 446D formed on the holding frame 446, the gap cannot be secured when the holding frame 446 is attached to the panel fixing plate 447. Accordingly, the adhesive for fixing the holding frame 446 and the panel fixing plate 447 spreads over the side of the holding frame 446 to be adhered on the display surface of the liquid crystal panel 441.

The above-described holding frame 446 and the panel fixing plate 447 may be constructed of a light-weight metal having excellent thermal conductivity such as aluminum, magnesium and titanium and alloy thereof, carbon steel, brass and stainless steel, and a resin (such as polycarbonate, polyphenylene sulfide and liquid crystal resin) in which a carbon filler (such as carbon fiber and carbon nanotube) or glass fiber is added. With the use of such materials, the heat generated on the liquid crystal panel 441 can be efficiently radiated toward the holding frame 446 and the panel fixing plate 447, thereby improving the heat-radiation performance of the liquid crystal panel 441.

Incidentally, though the holding frame 446 is constructed of the concave frame body 446A and the support plate 446B, the concave frame body 446A and the support plate 446B may be constructed of the same material selected from the above-described materials or may be constructed of different materials selected from the above-described materials. In the present invention, it is only necessary that at least the concave frame body 446A is constructed of the above-described material. The concave frame body 446A directly works for fixing the liquid crystal panel 441 on the side of the prism 444 since the hole 446D formed on the four corners of the concave frame body 446A and the pin 447B of the panel fixing plate 447 are adhered. On the other hand, the support plate 446B is only fixed to the concave frame body 446A and does not work for fixing the liquid crystal panel 441 onto the side of the prism 444.

Table 2 shows the thermal expansion coefficient of various materials that can be used for the holding frame 446 and the panel fixing plate 447.

TABLE 2

| | Material | Filling Amount [Weight %] | Thermal Expansion Coefficient ($\times 10^{-5}$/K) | |
|---|---|---|---|---|
| | | | Flow Direction | Square Direction |
| (A) | Polycarbonate Glass fiber | 30 | 1.4~2.0 | 3.5~5.6 |
| (B) | Polycarbonate Glass fiber | 40 | 1.2~2.5 | 2.7~3.7 |
| (C) | Polycarbonate Glass fiber | 50 | 1.0~2.4 | 2.3~3.3 |
| (D) | Polyphenylene sulfide Glass fiber | 40 | 1.0~2.2 | 2.3~6.0 |
| (E) | Polycarbonate Carbon fiber | 30 | 0.6~0.9 | 5.7~6.4 |
| (F) | Polyphenylene sulfide Carbon fiber | 30 | 1.6 | 2.3 |
| (G) | Liquid crystal resin Glass fiber | 30 | 0.5 | 5 |

TABLE 2-continued

| | Material | Filling Amount [Weight %] | Thermal Expansion Coefficient (×10⁻⁵/K) Flow Direction | Thermal Expansion Coefficient (×10⁻⁵/K) Square Direction |
|---|---|---|---|---|
| (H) | Magnesium alloy (AZ91D) | — | 2.72 | |
| (I) | Magnesium | — | 2.6 | |
| (J) | Aluminum alloy (ADC12) | — | 2.1 | |
| (K) | Aluminum | — | 2.4 | |
| (L) | Titanium | — | 2.5 | |
| (M) | Carbon steel | — | 1.18 | |
| (N) | Brass | — | 2 | |
| (O) | Stainless steel (SUS) | — | 1.1~1.6 | |
| (P) | Carbon fiber | — | 0.7 | 2.3 |

Incidentally, the materials (A) to (G) contain the resin described on the upper side of the material section and the fiber filler described on the lower side by the ratio described in the "filling amount" section. For instance, the material (A) is polycarbonate to which a glass fiber is added by 30 weight % and the material (B) is polycarbonate to which a glass fiber is added by 40 weight %.

Based on the various materials shown in the Tables 1 and 2, the materials of the cross dichroic prism 444, the panel fixing plate 447 and the holding frame 446 are selected so that the thermal expansion coefficient of the panel fixing plate 447 is within the range between the thermal expansion coefficient of the holding frame 446 and the thermal expansion coefficient of the cross dichroic prism 444.

In the present embodiment, an optical glass (BK-7) is used for the cross dichroic prism 444. Polycarbonate is used as a resin and glass fiber is used as a fiber filler for the panel fixing plate 447, the glass fiber being added by 40 weight %. Magnesium alloy (AZ91D) is used for the holding frame 446.

Table 3 shows a comparison of the thermal expansion coefficient of the panel fixing plate 447 and the thermal expansion coefficient of the cross dichroic prism 444 and the holding frame 446. Incidentally, in the Table 3, the signs (A) to (P) shown in the Table 2 are used for representing the material of the panel fixing plate 447 and the holding frame 446.

TABLE 3

| Material | Cross Dichroic Prism Optical Glass (BK-7) | Panel Fixing Plate (B) | Holding Frame (H) |
|---|---|---|---|
| Thermal Expansion Coefficient (×10⁻⁵/K) | 0.71 | 1.2~2.5 (Flow Direction) 2.7~3.7 (Square Direction) | 2.72 |

As shown in FIG. 3, the thermal expansion coefficient of the cross dichroic prism 444 is 0.71(×10⁻⁵/K), and the thermal expansion coefficient of the holding frame 446 is 2.72(×10⁻⁵/K)

On the other hand, the thermal expansion coefficient of the panel fixing plate 447 is 1.2 to 2.5 (×10⁻⁵/K) in the flow direction and 2.7 to 3.7 (×10⁻⁵/K) in the square di The flow direction refers to the flow direction of the resin molded article during a molding process and the square direction is the direction orthogonal to the flow direction. The thermal expansion coefficient of the panel fixing plate 447 in the square direction falls out of the range between the thermal expansion coefficient of the holding frame 446 and the thermal expansion coefficient of the cross dichroic prism 444, however, the thermal expansion coefficient of the panel holding frame 446 in the flow direction is within the above range. In the present invention, it is only necessary that at least one of the thermal expansion coefficient either in the flow direction or the square direction of the panel fixing plate 447 is within the range between the thermal expansion coefficient of the holding frame 446 and the thermal expansion coefficient of the cross dichroic prism 444. The holding frame 446 works for holding the liquid crystal panel and, in general, the length along the advancing direction of the light beam is exceeded by the length along two directions orthogonal to the advancing direction. Accordingly, by arranging the latter direction as the flow direction, the thermal stress can be reduced.

Incidentally, the combination of the materials of the cross dichroic prism 444, the panel fixing plate 447 and the holding frame 446 may not be limited to the one shown in Table 3.

Table 4 shows the other examples of the combination of the materials of the cross dichroic prism 444, the panel fixing plate 447 and the holding frame 446. Incidentally, in the Table 4, the signs (A) to (P) shown in the Table 2 is used for representing the material of the panel fixing plate 447 and the holding frame 446.

TABLE 4

| | | Cross Dichroic Prism | | Panel Fixing Plate | | Holding Frame | |
|---|---|---|---|---|---|---|---|
| | | Material | Thermal Expansion Coefficient (×10⁻⁵/K) | Material | Thermal Expansion Coefficient (×10⁻⁵/K) | Material | Thermal Expansion Coefficient (×10⁻⁵/K) |
| Example of Combination | 1 | Optical Glass (BK-7) | 0.71 | (A) | 1.4~2.0 | (H) | 2.72 |
| | 2 | Optical Glass (BK-7) | 0.71 | (D) | 1.0~2.2 | (H) | 2.72 |

TABLE 4-continued

| | | Cross Dichroic Prism | | Panel Fixing Plate | | Holding Frame | |
|---|---|---|---|---|---|---|---|
| | | Material | Thermal Expansion Coefficient (×10⁻⁵/K) | Material | Thermal Expansion Coefficient (×10⁻⁵/K) | Material | Thermal Expansion Coefficient (×10⁻⁵/K) |
| | 3 | Optical Glass (BK-7) | 0.71 | (O) | 1.1~1.6 | (H) | 2.72 |
| | 4 | Optical Glass (BK-7) | 0.71 | (O) | 1.1~1.6 | (J) | 2.1 |
| | 5 | Optical Glass (BK-7) | 0.71 | (E) | 0.6~0.9 | (A) | 1.4~2.0 |
| | 6 | Optical Glass (BK-7) | 0.71 | (M) | 1.18 | (A) | 1.4~2.0 |
| | 7 | Optical Glass (BK-7) | 0.71 | (M) | 1.18 | (F) | 1.6 |
| Comparison | 1 | Optical Glass (BK-7) | 0.71 | Acrylic Resin | 6 | (H) | 2.72 |

Though the above 1 to 7 are listed as examples of the combination, the other combination may be used based on the Tables 1 and 2. Further, though the cross dichroic prism 444, the panel fixing plate 447 and the holding frame 446 are arranged in ascending order of thermal expansion coefficient in the combination examples 1 to 7 shown in Table 4, it is only necessary that the thermal expansion coefficient of the panel fixing plate 447 is within the range between the thermal expansion coefficient of the holding frame 446 and the thermal expansion coefficient of the cross dichroic prism 444, which may be a combination where the holding frame 446, the panel fixing plate 447 and the cross dichroic prism 444 are in descending order of thermal expansion coefficient. For instance, the optical glass (BK-7) is used as the cross dichroic prism 444 and the material (E) shown in Table 2 is used for the panel fixing plate 447 and the material (G) shown in Table 2 is used for the holding frame 446.

The material of the panel fixing plate 447 may be a combination of a resin (polycarbonate, polyphenylene sulfide and liquid crystal resin) and a fiber filler (glass fiber and carbon fiber) as shown in (A) to (G) of Table 2, where the fiber filler such as glass fiber and carbon fiber may preferably added by 50 weight % or less. For instance, when glass fiber or carbon fiber as the fiber filler is added by more than 50 weight %, the thermal expansion coefficient of the panel fixing plate becomes close to the thermal expansion coefficient of the cross dichroic prism 444. And the difference between the thermal expansion coefficient of the panel fixing plate and the thermal expansion coefficient of the holding frame 446 is magnified. Accordingly, when the temperature of the optical device 44 is raised, the thermal stress generated on the boundaries between the panel fixing plate and the holding frame 446 is increased, so that position shift of the panel fixing plate is likely to be caused.

Further, as shown in the comparison of Table 4, the material of the panel fixing plate 447 conventionally has been acrylic resin. The thermal expansion coefficient of the acrylic resin is 6 (×10⁻⁵/K). Accordingly, there is great difference between the thermal expansion coefficients of the cross dichroic prism 444 and the holding frame 446 and, when the temperature of the optical device 44 is raised, great thermal stress is generated on the boundaries between the panel fixing plate and the holding frame 446 and between the panel fixing plate and the cross dichroic prism 444, so that the position shift of the panel fixing plate is likely.

The panel fixing plate 447 of the present embodiment works as a light-shielding member for shielding the light beam. Accordingly, the extra light beam incident on the cross dichroic prism 444 from a part other than the image formation area of the liquid crystal panel 441 can be shielded. Further, the light beam reflected by the cross dichroic prism 444 is prevented from reflecting again toward the cross dichroic prism 444.

The above-described optical device 44 is manufactured as follows.

(a) Initially, the base 445 is fixed on the lower side of the cross dichroic prism 444 by an adhesive.

(b) Further, the irradiation-side polarization plate 443 is fixed on the support surface 447A3 of the panel fixing plate 447 by a two-sided tape or an adhesive.

Figure 11:
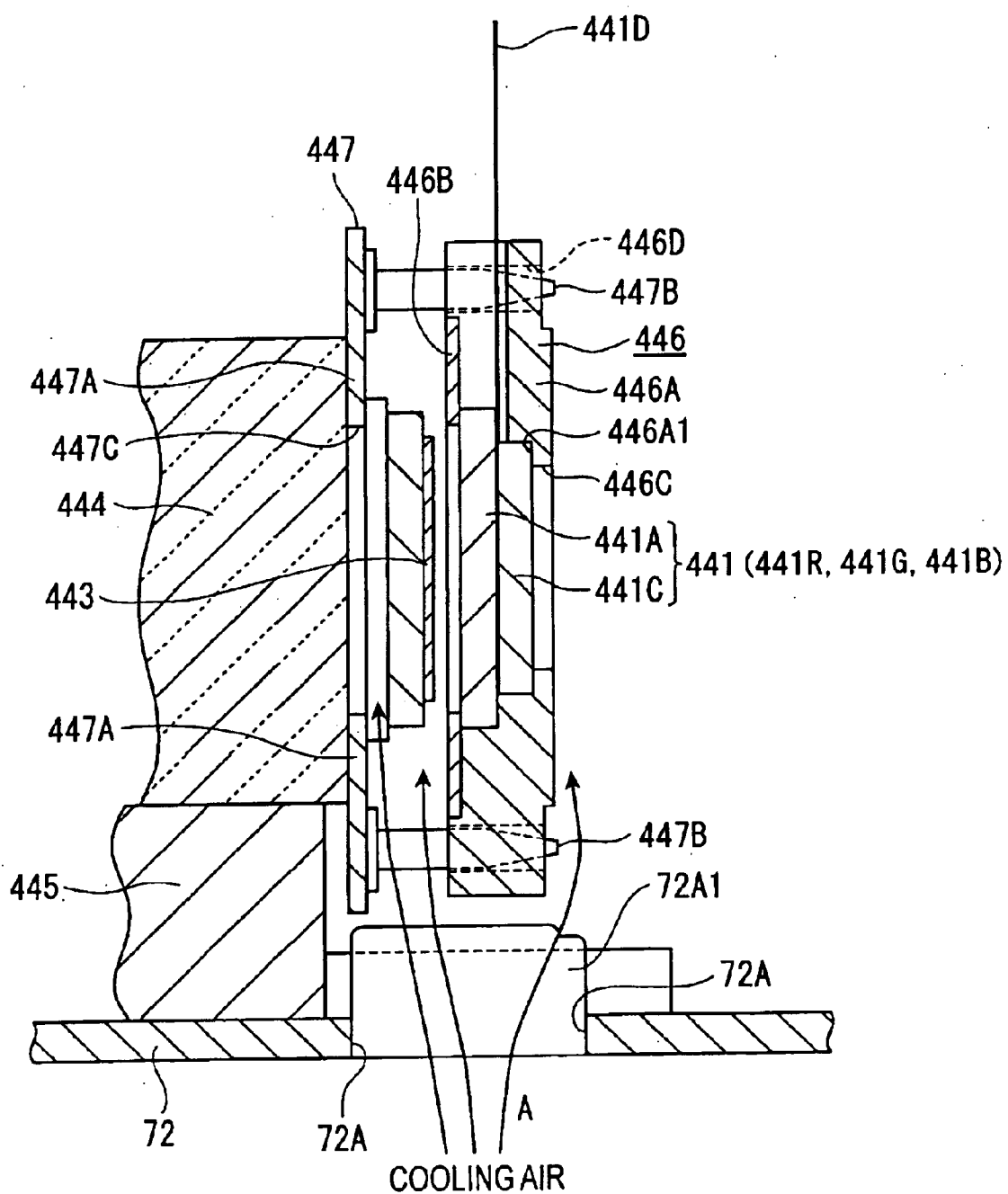
FIG. 11 is another illustration showing a cooling channel of a cooling system A of the aforesaid embodiment.

(c) The respective liquid crystal panels 441R, 441G and 441B are accommodated in the accommodating portion 446A1 of the concave frame body 446A of the holding frame 446 (see FIG. 11). Subsequently, the support plate 446B of the holding frame 446 is attached from the side of the concave frame body 446A from which the liquid crystal panel is inserted and the respective liquid crystal panels 441R, 441G and 441B are pressed and fixed.

(d) The pin 447B of the panel fixing plate 447 with a photo-curing adhesive coated thereon is inserted to the hole 446D of the holding frame 446 accommodating the respective liquid crystal panels 441R, 441G and 441B.

(e) The side of the panel fixing plate 447 opposite to the pin 447B is closely attached on the light-incident side of the cross dichroic prism 444 though an adhesive. At this time, the panel fixing plate 447 is closely attached on the side of the cross dichroic prism 444 by a surface tension of the adhesive.

(f) While the photo-curing adhesive is uncured, the position of the respective liquid crystal panels 441R, 441G and 441B is adjusted.

(f) After adjusting the position of the respective liquid crystal panels 441R, 441G and 441B, ultraviolet is irradiated from between the panel fixing plate 447 and the cross dichroic prism 444 and from the distal side of the pin 447B of the panel fixing plate 447. Thereafter, the photo-curing adhesive is cured to fix the panel fixing plate 447 and the cross dichroic prism 444, and the panel fixing plate 447 and the holding frame 446 are fixed by the pin 447B.

Incidentally, the adhesive for fixing the panel fixing plate 447, the cross dichroic prism 444 and the holding frame 446 may not be a photo-curing adhesive but may be a thermosetting adhesive. In such arrangement, a hot air etc. is blown between the components to cure the adhesive.

(4) Cooling Structure

Figure 9:
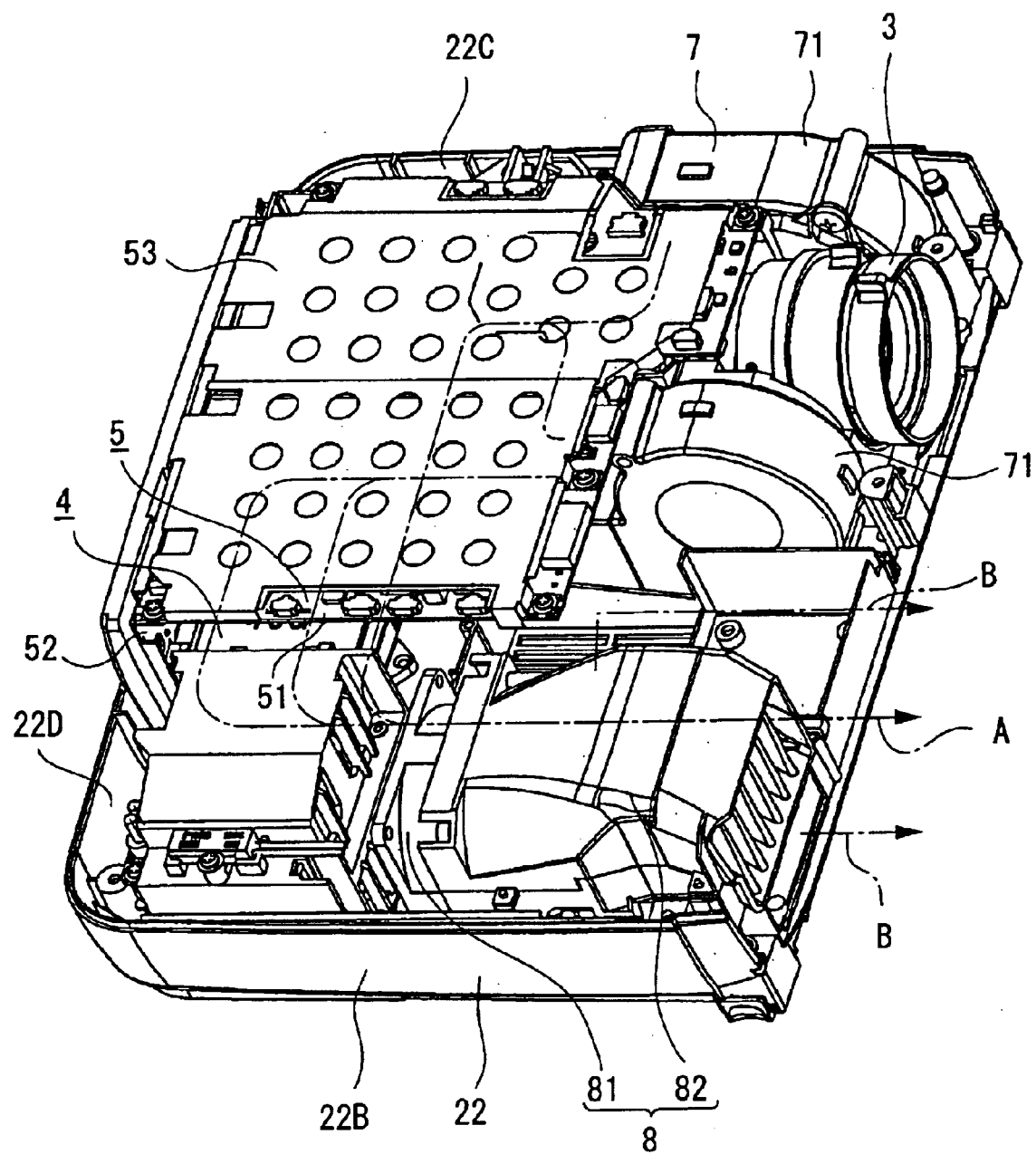
FIG. 9 is a schematic perspective view showing a cooling system of the projector of the aforesaid embodiment.

As shown in FIG. 9, the above-described projector 1 has a cooling system A of the optical device 44 and a cooling system B of the power supply block 6 thereinside.

The cooling system A is a flow of a cooling air drawn in through the opening 29 by an intake duct unit 7.

Figure 10:
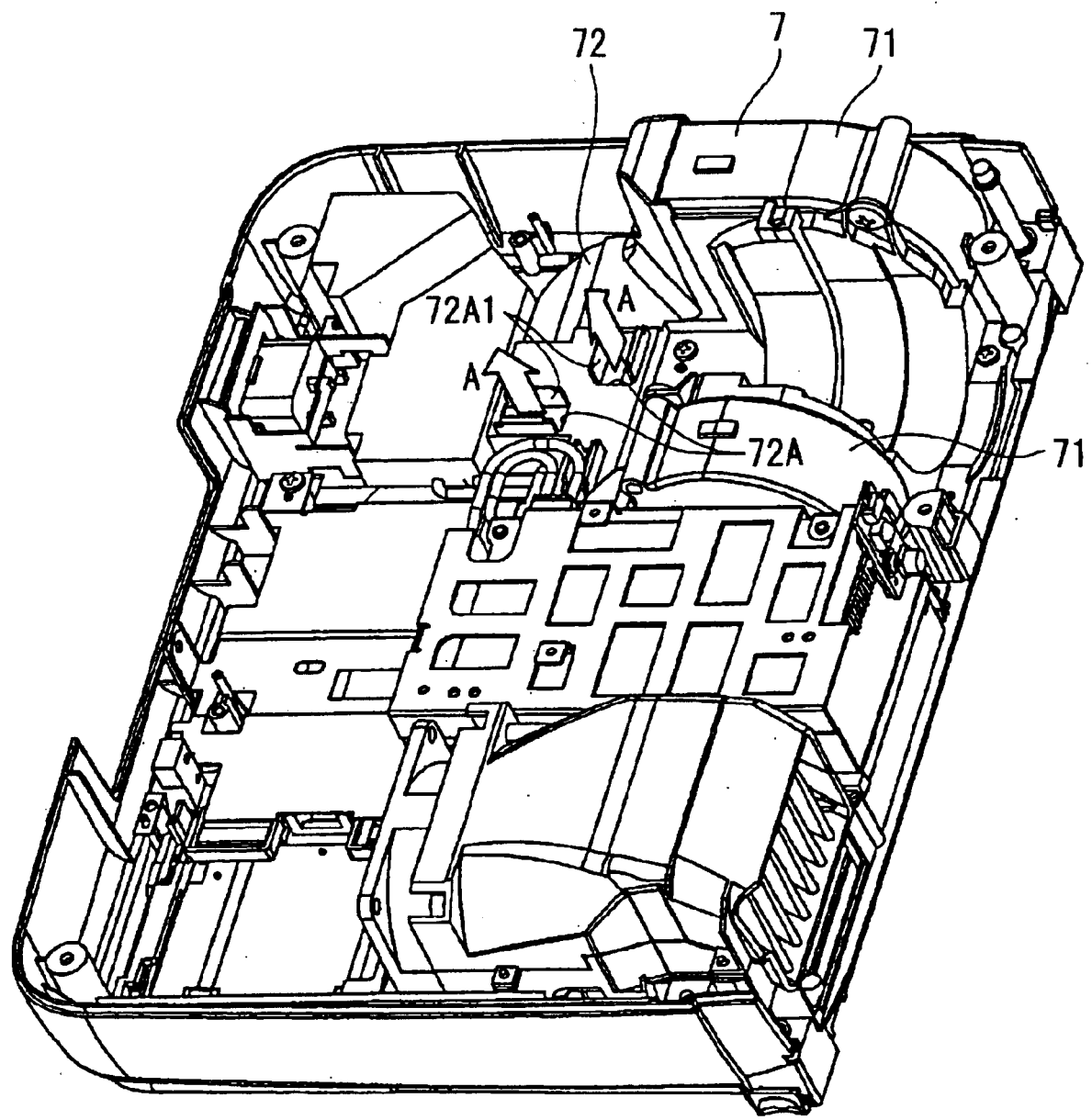
FIG. 10 is an illustration showing a cooling channel of a cooling system A of the aforesaid embodiment.

The intake duct unit 7 has a pair of sirocco fans 71 oppositely disposed sandwiching the projection lens 3, an intake duct (not shown) for intercommunicating the intake side of the pair of sirocco fans 71 with the opening 29 and a wind-guide duct 72 for introducing the intake air toward a predetermined position as shown in FIG. 10.

As shown in FIG. 10, an opening 72A is formed at the terminal end of the wind-guide duct 72 and the opening 72A is located on the lower side of the optical device 44. The opening 72A has a rising piece 72A1 projecting upward, so that the flow of the cooling air is rectified from the lower side to the upper side.

The cooling air taken in by the sirocco fan 71 is supplied to the lower side of the optical device 44 through the wind-guide 72 and is flowed from the opening 72A to the upper side. Then, as shown in FIG. 11, the cooling air is rectified by the rising piece 72A1 to be flowed between the cross dichroic prism 444 and the irradiation-side polarization plate 443, between the irradiation-side polarization plate 443 and the liquid crystal panel 441, and between the liquid crystal panel 441 and the incident-side polarization plate 442 to cool the liquid crystal panel 441, the irradiation-side polarization plate 443 and the incident-side polarization plate 442.

A part of the cooling air drawn in by the sirocco fan 71 is used as a cooling air for cooling the polarization converter 414 and the light source lamp 416 as shown in FIG. 9.

In other words, a part of the cooling air flows through the gap formed between the bottom side 22A of the lower case 22 and the lower side of the lower light guide 401 and is branched in two directions at the intermediary section thereof. One of the branched cooling air is supplied into the inside of the light guide 40 through a slit hole formed on the lower side of the lower light guide 401 at a position corresponding to the polarization converter 414 to cool the polarization converter 414 and, subsequently, is supplied to the light source 411 to cool the light source lamp 416. The other branched cooling air is directly supplied to the light source 411 to cool the light source lamp 416.

The air having cooled the light source lamp 416 is concentrated by an exhaust duct unit 8 having an exhaust fan 81 and an exhaust duct 82 to be discharged to the outside of the projector 1 from the opening 35 of the front case 23.

As shown in FIG. 9, the cooling air flowing toward the upper side of the optical device 44 collides with the main board 51 of the control board 5 to perpendicularly change the flowing direction thereof to cool the various circuit elements installed on the main board 51.

The cooling air having cooled the main board 51 is concentrated by the exhaust duct unit 8 having the exhaust fan 81 and the exhaust duct 82 to be discharged toward the outside of the projector 1 from the opening 35 of the front case 23.

On the other hand, the cooling system B is a flow of the cooling air drawn in through the opening 30 by the intake fan (not shown) provided on the power supply unit 61, the cooling system B cooling the power supply unit 61 and the lamp driving unit 62.

A part of the cooling air drawn in from the opening 30 by the intake fan is supplied to the inside of the cylindrical body 612 of the power supply unit 61 to cool the circuit elements installed on the substrate body. The other part of the cooling air flows on the lower side of the cylindrical body 612 to be supplied to the lamp driving unit 62 to cool the circuit elements installed on the substrate 621 of the lamp driving unit 62.

The air having cooled the power supply block 6 is discharged to the outside through the opening 35.

(5) Advantages of the Embodiment

According to the above-described embodiment, following advantages can be obtained.

(5-1) Since the panel fixing plate 447 is constructed of a component having a thermal expansion coefficient within the range between the thermal expansion coefficients of the holding frame 446 and the cross dichroic prism 444, the thermal stress generated on the respective boundaries between the panel fixing plate 447 and the holding frame 446 and between the panel fixing plate 447 and the cross dichroic prism 444 can be reduced. Accordingly, even when the temperature of the optical device 44 is raised, the position shift of the liquid crystal panel 441 can be avoided without unstabilizing the connection between the panel fixing plate 447 and the holding frame 446 and the cross dichroic prism 444. Further, the deterioration of the optical device 44 can be prevented and clear image can be continuously formed.

(5-2) Since the panel fixing plate 447 is produced by, for instance, molding a resin composition of glass fiber and polycarbonate by injection-molding process, the panel fixing plate 447 can be easily manufactured and the production cost can be greatly reduced. Further, the weight of the panel fixing plate 447 can be reduced, so that the weight of the optical device and, consequently, the projector 1 using the optical device can be reduced. Further, since the glass fiber is contained, the strength of the panel fixing plate 447 and the mechanical strength of the optical device 44 can be maintained.

(5-3) Since the panel fixing plate 447 is a light-shielding component, extra light beam incident on the cross dichroic prism 444 from a part other than the image formation area of the liquid crystal panel 441 can be shielded. Further, the light beam reflected by the cross dichroic prism 444 is not again reflected toward the cross dichroic prism 444. Accordingly, extra light can be shielded and deterioration of the contrast on account of stray light can be prevented.

(5-4) The cross dichroic prism 444 is made of an optical glass. When more than 50 weight % of the glass fiber as a fiber filler is added to the panel fixing plate 447, the thermal expansion coefficient of the panel fixing plate 447 becomes close to the thermal expansion coefficient of the cross dichroic prism 444. In other words, the difference between the thermal expansion coefficients of the holding frame 446 and the panel fixing plate 447 is magnified, so that great thermal stress is generated between the holding frame 446 and the panel fixing plate 447 and the position shift of the liquid crystal panel 441 cannot be prevented. In the present embodiment, since 40 weight % of glass fiber is added to the panel fixing plate 447, the thermal expansion coefficient can be kept midway between the thermal expansion coefficients of the holding frame 446 and the cross dichroic prism 444, thereby preventing the position shift of the liquid crystal panel 441.

(5-5) Since a pin 447B for fixing the holding frame 446 is provided on the panel fixing plate 447, the number of the components of the panel fixing plate 447 can be reduced and the structure can be simplified as compared to the conventional POP structure, thereby facilitating the production thereof. Further, since the heat on the liquid crystal panel 441 can be released through the pin 447B, the heat-radiation performance of the liquid crystal panel 441 can be improved.

(5-6) The pin 447B becomes thinner from the base end toward the distal end and the panel fixing plate 447 and the holding frame 446 are fixed by a photo-curing adhesive. Accordingly, when the photo-curing adhesive is cured by irradiating a light beam from the distal end of the pin 447B, the light beam is less reflected or absorbed at the distal end of the pin 447B, so that sufficient amount of the light beam can be irradiated on the photo-curing adhesive at the portion connecting the pin 447B and the holding frame 446. Therefore, the panel fixing plate 447 and the holding frame 446 can be efficiently and securely fixed within a short time.

(5-7) The notch 447A2 is formed on the rectangular plate body 447A of the panel fixing plate 447. Even when a thermal stress is applied on the panel fixing plate 447 by the heat generated by the optical device 44, the notch 447A2 absorbs the deformation of the outer profile of the panel fixing plate 447. Accordingly, the position shift of the liquid crystal panel 441 caused by a heat can be prevented.

(5-8) Since the support surface 447A3 is provided on the rectangular plate body 447A of the panel fixing plate 447 and the irradiation-side polarization plate 443 is fixed on the support surface 447A3, the heat can be transferred from the irradiation-side polarization plate 443 to the panel fixing plate 447, thereby improving the heat-radiation performance of the irradiation-side polarization plate 443.

(5-9) Since the support surface 447A3 is provided on the rectangular plate body 447A of the panel fixing plate 447, the irradiation-side polarization plate 443 can be fixed on the support surface 447A3 with a predetermined gap, thereby further improving the heat-radiation performance of the irradiation-side polarization plate 443.

(5-10) The holding frame 446 is made of a magnesium alloy. Accordingly, the thermal expansion coefficients of the cross dichroic prism 444 and the holding frame 446 become relatively close, and by arranging the thermal expansion coefficient of the panel fixing plate 447 interposed therebetween to be a middle value thereof, the thermal stress generated on the boundaries of the respective components of the entire optical device 44 can be reduced.

(5-11) The holding frame 446 is made of a magnesium alloy. Accordingly, the heat generated on the liquid crystal panel 441 can be efficiently radiated, thereby improving the heat-radiation performance of the liquid crystal panel 441.

(6) Modification of Embodiment

Incidentally, the scope of the present invention is not restricted to the above embodiment, but includes following modifications.

Though the panel fixing plate 447 is constructed of integrating the rectangular plate body 447A and the pin 447B in the above embodiment, different arrangement is possible. For instance, the pin 447B may be solely used as the panel fixing plate. At this time, since the pin 447B has the thermal expansion coefficient lying midway between the thermal expansion coefficients of the holding frame 446 and the cross dichroic prism 444, the thermal stress generated on the boundary of the holding frame 446 and the cross dichroic prism 444 can be reduced. Accordingly, the position shift of the liquid crystal panel 441 can be avoided.

Though the panel fixing plate 447 is molded by injection-molding in the above embodiment, different arrangement is possible. For instance, the panel fixing plate 447 may be formed by blow-molding and vacuum forming and the like.

Though the panel fixing plate 447 has the notch 447A2 extending orthogonal to the upper and lower edges of the rectangular plate body 447A from the outer periphery toward the opening 447A1, the notch 447A2 may be positioned in a different manner. For instance, the notch 447A2 may be formed orthogonal to the right and left edges of the rectangular plate body 447A from the outer periphery to the opening 447A1. Alternatively, the notch may be formed orthogonal to the upper and lower or right and left edges from the opening 447A1 to the outer periphery.

Though the base 445 is fixed on the lower side of the cross dichroic prism 44 in the above embodiment, such arrangement is not limiting. For instance, the base 445 may be fixed on the upper side of the cross dichroic prism 444. According to such an arrangement, the optical device 44 can be easily attached to and detached from the lower light guide 401.

A heat-conductive adhesive may be filled in the gap between the base 445 and the panel fixing plate 447 in the above embodiment. According to the above arrangement, the heat can be efficiently transferred between the panel fixing plate 447 and the base 445, thereby improving the heat-radiation performance of the liquid crystal panel 441 and the irradiation-side polarization plate 443.

Though the cross dichroic prism 444 is constructed of the four right-angle prisms made of an optical glass and a dielectric multi-layered film in the above embodiment, such arrangement is not limiting. For instance, an arrangement where a cross mirror is disposed inside an approximately rectangular parallelepiped or cubic container made of glass and the like and a liquid is filled in the container may be used. In other words, any arrangement is possible as long as the cross dichroic prism 444 has a function for combining color lights and a is provided with light-beam incident side on which the panel fixing plate 447 is attached.

Though the projector 1 uses three liquid crystal panels 441 in the above embodiment, such arrangement is not limiting. For instance, the present invention may be applied to a projector using a single liquid crystal panel, a projector using two liquid crystal panels, and a projector using four or more liquid crystal panels.

Though the present invention is applied to the planarly-viewed approximately L-shaped optical unit 4 in the above embodiment, the present invention may be applied to a planarly-viewed approximately U-shaped optical unit 4. In such arrangement, since the power supply unit and the like is disposed at the center of the U-shape, the present invention can be further effectively applied in improving the cooling efficiency of the components.

Though the liquid crystal panel is used as the optical modulator in the above embodiment, an optical modulator other than liquid crystal such as a device using a micro-mirror may be used.

Though a transmissive optical modulator having different light-incident side and light-irradiation side is used in the above embodiment, a reflective optical modulator having the same light-incident and light-irradiation side may be used.

Though a front-type projector that projects an optical image in a direction for observing the screen is used as an example in the above embodiment, the present invention may be applied to a rear-type projector that projects an optical image in a direction opposite to the direction for observing the screen.

Industrial Availability

As described above, since the position shift of the optical modulator can be prevented and clear optical image can be formed, the optical device of the present invention can be effectively used as an optical device for a projector used in the field of presentation and home-theater purpose.

What is claimed is:

1. An optical device, comprising;
   a plurality of optical modulators that respectively modulates a plurality of color lights in accordance with image information;
   a color-combining optical element that combines the respective color lights modulated by the optical modulators, the color-combimng optical element being integrated with the optical modulators;
   a holding frame that holds that optical modulator and has an opening at a portion corresponding to an image formation area of the optical modulator; and
   a holder disposed between the holding frame and the color-combining optical element,
   wherein the holder includes a component having a thermal expansion coefficient lying midway between the thermal expansion coefficients of the holding frame and the color-combining optical element, and
   wherein the optical modulator is fixed on a side of the color-combining optical element through the holding frame and the holder.

2. The optical device according to claim 1, wherein the holder is a molded article obtained by molding a resin composition composed of a fiber filler and a resin.

3. The optical device according to claim 2, wherein the resin composition is 50 weight % or less of the fiber filler.

4. The optical device according to claim 1,
   wherein holes are formed in at least two parts of the holding frame, and
   wherein the holder has a rectangular plate body having an opening at a position corresponding to the opening of the holding frame and a pin projecting from the rectangular plate body to be inserted to the hole of the holding frame.

5. The optical device according to claim 4, wherein a distal end of the pin is thinner than a base end thereof.

6. The optical device according to claim 5, wherein the holding frame and the holder are fixed by a photo-curing adhesive.

7. The optical device according to claim 4, wherein a notch for absorbing a deformation result from a thermal stress applied on the rectangular plate body is formed on the rectangular plate body.

8. A projector, comprising:
   an optical device according to claim 1; and a projection lens for projecting an image formed by the optical device.

9. The optical device according to claim 2,
   wherein holes are formed in at least two parts of the holding frame, and
   wherein the holder has a rectangular plate body having an opening at a position corresponding to the opening of the holding frame and a pin projecting from the rectangular plate body to be inserted to the hole of the holding frame.

10. The optical device according to claim 3,
    wherein holes are formed in at least two parts of the holding frame, and
    wherein the holder has a rectangular plate body having an opening at a position corresponding to the opening of the holding frame and a pin projecting from the rectangular plate body to be inserted to the hole of the holding frame.

11. The optical device according to claim 5, wherein a notch for absorbing a deformation result from a thermal stress applied on the rectangular plate body is formed on the rectangular plate body.

12. The optical device according to claim 6, wherein a notch for absorbing a deformation result from a thermal stress applied on the rectangular plate body is formed on the rectangular plate body.

13. A projector, comprising:
    an optical device according to claim 2; and a projection lens for projecting an image formed by the optical device.

14. A projector, comprising:
    an optical device according to claim 3; and a projection lens for projecting an image formed by the optical device.

15. A projector, comprising:

an optical device according to claim 4; and a projection lens for projecting an image formed by the optical device.

16. A projector, comprising:

an optical device according to claim 5; and a projection lens for projecting an image formed by the optical device.

17. A projector, comprising:

an optical device according to claim 6; and a projection lens for projecting an image formed by the optical device.

18. A projector, comprising:

an optical device according to claim 7; and a projection lens for projecting an image formed by the optical device.

* * * * *